US008384781B2

(12) United States Patent
Higuchi et al.

(10) Patent No.: US 8,384,781 B2
(45) Date of Patent: Feb. 26, 2013

(54) STEREO CAMERA DEVICE

(75) Inventors: Mirai Higuchi, Hitachi (JP); Shoji Muramatsu, Hitachinaka (JP); Soichiro Yokota, Kawaguchi (JP); Tatsuhiko Monji, Hitachinaka (JP)

(73) Assignee: Hitachi, Ltd., Tokyo (JP)

( * ) Notice: Subject to any disclaimer, the term of this patent is extended or adjusted under 35 U.S.C. 154(b) by 812 days.

(21) Appl. No.: 12/333,853

(22) Filed: Dec. 12, 2008

(65) Prior Publication Data
US 2009/0153664 A1 Jun. 18, 2009

(30) Foreign Application Priority Data
Dec. 14, 2007 (JP) ................................. 2007-323762

(51) Int. Cl.
*H04N 7/18* (2006.01)
*G06K 9/00* (2006.01)

(52) U.S. Cl. ........................................ 348/148; 382/154
(58) Field of Classification Search .................. 348/148; 382/154

See application file for complete search history.

(56) References Cited

U.S. PATENT DOCUMENTS

| 5,410,346 | A | * | 4/1995 | Saneyoshi et al. | 348/116 |
| 5,606,627 | A | * | 2/1997 | Kuo | 382/154 |
| 7,643,025 | B2 | * | 1/2010 | Lange | 345/419 |
| 2002/0055808 | A1 | * | 5/2002 | Matsumoto | 701/1 |
| 2002/0141635 | A1 | * | 10/2002 | Swift et al. | 382/154 |
| 2004/0056950 | A1 | * | 3/2004 | Takeda | 348/92 |
| 2004/0212484 | A1 | * | 10/2004 | Su et al. | 340/435 |
| 2004/0234124 | A1 | * | 11/2004 | Nakai et al. | 382/154 |
| 2006/0192660 | A1 | * | 8/2006 | Watanabe et al. | 340/435 |
| 2007/0263902 | A1 | * | 11/2007 | Higuchi et al. | 382/104 |

FOREIGN PATENT DOCUMENTS

| JP | 08014828 | A | * | 1/1996 |
| JP | 11242754 | A | * | 9/1999 |
| JP | 3018920 | B2 | | 1/2000 |
| JP | 2000013818 | A | * | 1/2000 |
| JP | 2001222723 | A | * | 8/2001 |
| JP | 2002176661 | A | * | 6/2002 |
| JP | 2003050274 | A | * | 2/2003 |
| JP | 2004272515 | A | * | 9/2004 |
| JP | 2005250978 | A | * | 9/2005 |
| JP | 2011220842 | A | * | 11/2011 |
| WO | WO 9813716 | A1 | * | 4/1998 |

* cited by examiner

*Primary Examiner* — Wing F Chan
*Assistant Examiner* — Kostas Katsikis
(74) *Attorney, Agent, or Firm* — Crowell & Moring LLP

(57) ABSTRACT

A stereo camera device includes: plural picture image taking sections, an image correction section which makes correction of picture images taken, a parallax calculating section which calculates parallax, an amount of dislocation between the left and right images, and an image recognition section which carries out image recognition processing using both the image taken and the calculated parallax, or either of them. The stereo camera device further includes: a processing area setting up section which sets up the image area to be processed and reduction ratio differently depending on the driving environment of the vehicle on which the stereo camera device is mounted, wherein, by using the image area and the reduction ratio set up by the processing area setting up section, the image correction section makes correction to the picture image, the parallax calculating section calculates parallax, and the image recognition section carries out processing of image recognition.

6 Claims, 18 Drawing Sheets

F I G . 2
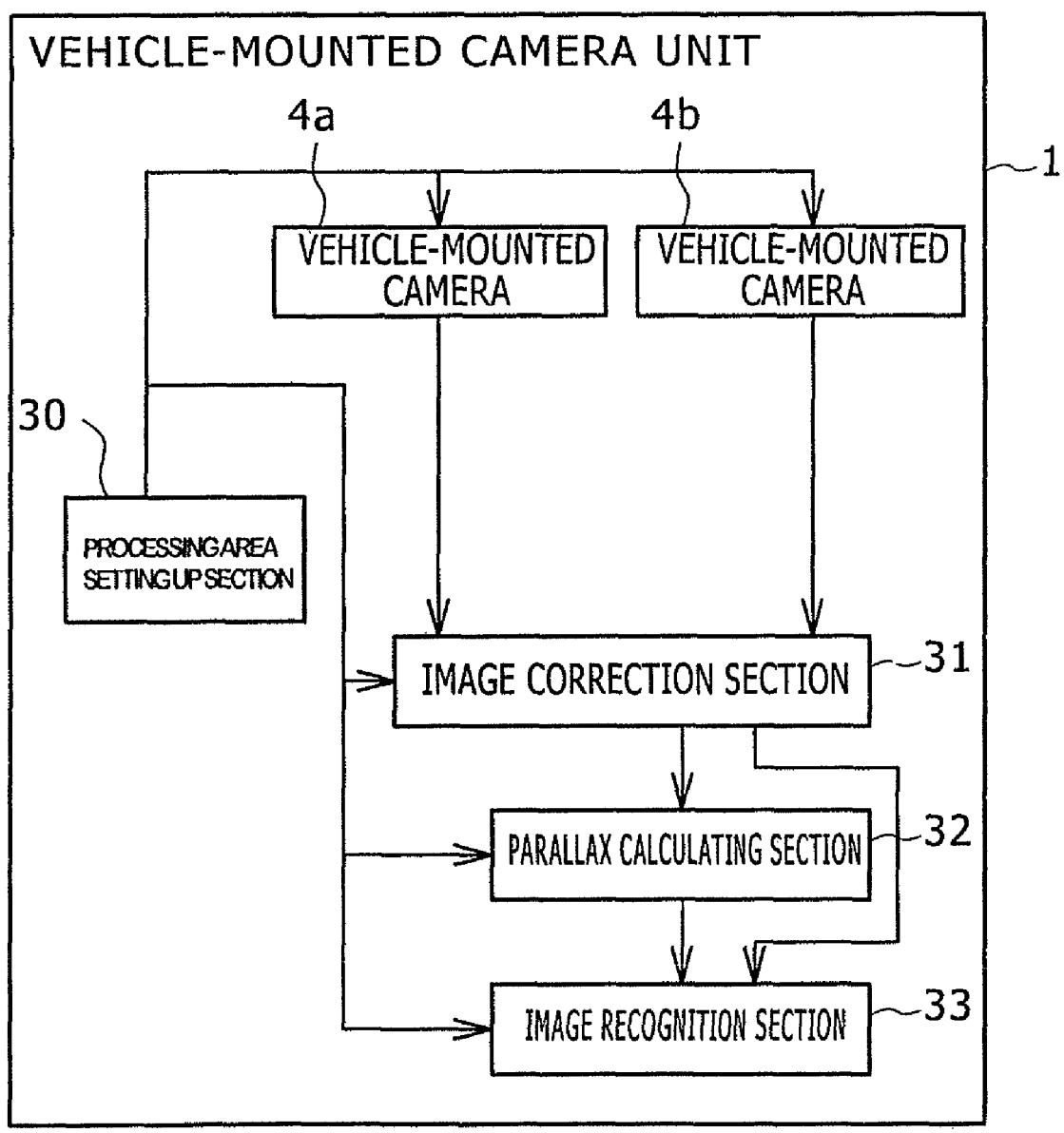

RIGHT IMAGE:AT THE TIME OF HIGH SPEED

RIGHT IMAGE:AT THE TIME OF LOW SPEED, BACKWARD DRIVE LEFT TURN, AND RIGHT TURN

FIG.13
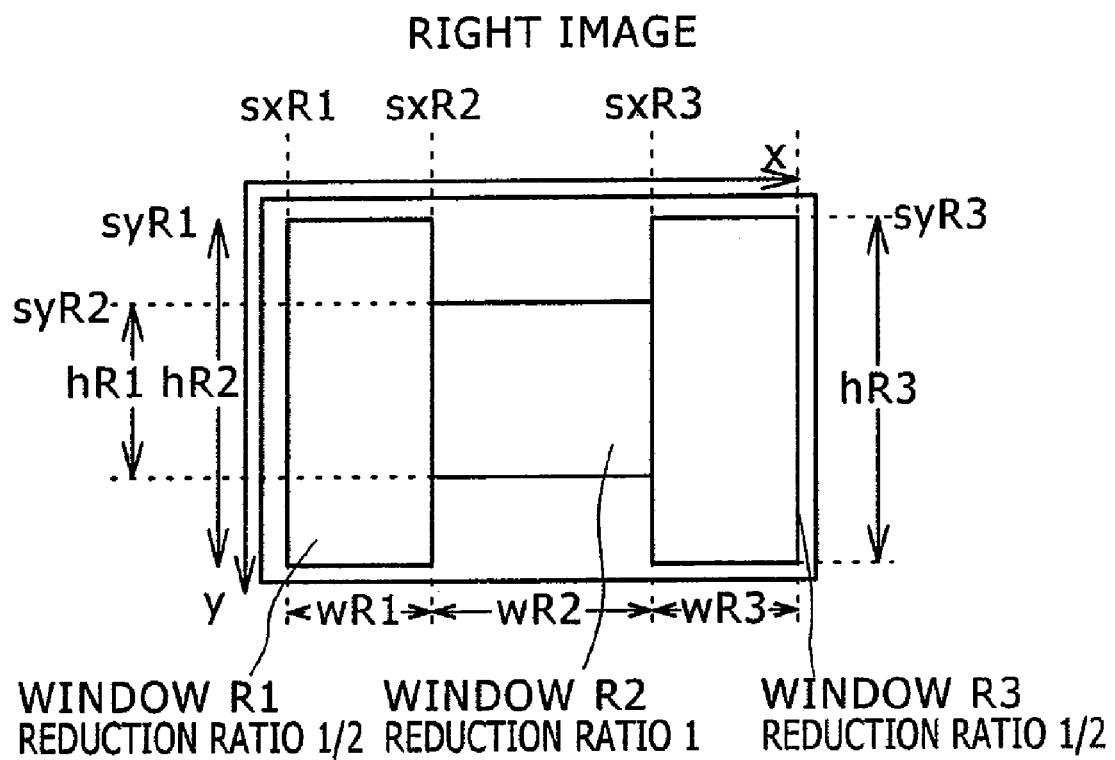
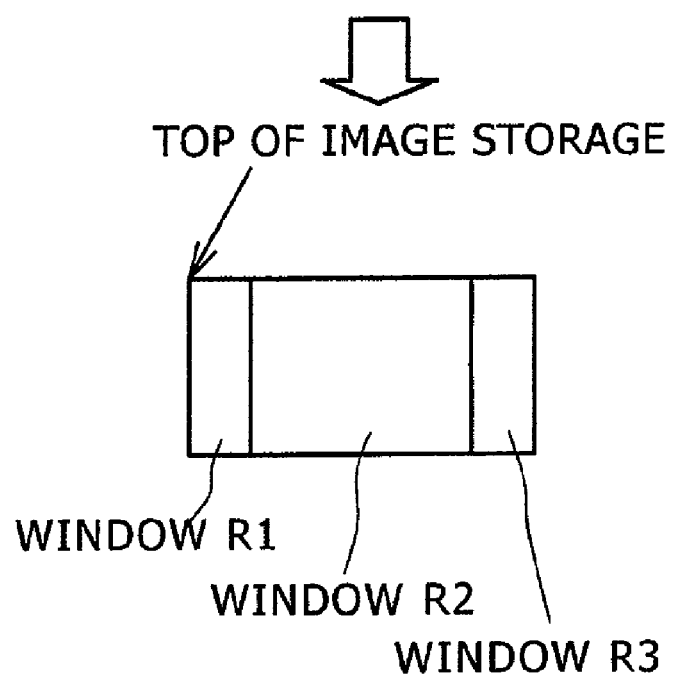

LEFT IMAGE

RIGHT IMAGE

FIG.17A mode 1

| | |
|---|---|
| REDUCTION RATIO (rR1) | R1 |
| WINDOW SIZE (wR1) | W1 |
| WINDOW SIZE (hR1) | W1 |
| WINDOW STARTING POSITION (LATERAL) (sxR1) | SX1 |
| WINDOW STARTING POSITION (LONGITUDINAL) (syR1) | SY1 |

FIG.17B mode 2

| | BARRIER OBJECT NOT EXISTING | BARRIER OBJECT EXISTING (x:x1~x2) | BARRIER OBJECT EXISTING (x:x3~x4) | BARRIER OBJECT EXISTING (x:x5~x6) |
|---|---|---|---|---|
| REDUCTION RATIO (rR1) | R2 | R2 | R2 | R2 |
| WINDOW SIZE (wR1) | W2 | W2 | W2 | W2 |
| WINDOW SIZE (hR1) | W2 | W2 | W2 | W2 |
| WINDOW STARTING POSITION (LATERAL) (sxR1) | SX2 | SX3 | SX4 | SX5 |
| WINDOW STARTING POSITION (LONGITUDINAL) (syR1) | SY2 | SY2 | SY2 | SY2 |

RIGHT IMAGE:mode 2

RIGHT IMAGE:mode 1

STEREO CAMERA DEVICE

BACKGROUND OF THE INVENTION

This invention relates to a stereo camera device and in particular to a stereo camera device suitable for being fitted with a high-resolution type image pickup device.

In recent years, a object detection device which utilizes a stereo camera to detect pedestrians, vehicles, and objects has been put to practical use. This device checks a plurality of images taken at the same time and calculates displacements (parallax differences) of a same object on each image by template matching. Based on the calculated parallax difference obtained from the above, it is possible also to calculate the positions of the object in the real space by a well-known conversion equation.

The stereo camera device of the present invention uses a pair of images photographed by two sets of image-taking means to recognize the object by calculating the distance to the object. The stereo camera device having the abovementioned function is beginning to find applications for a monitoring system to detect intrusion by suspicious individuals or any other abnormality, or for a vehicle-mounted system to support safe driving of cars.

The stereo image processing used for monitoring systems and vehicle-mounted systems is to measure distances with the application of triangulation technique to a pair of picture images of an object taken a certain distance apart from each other. Generally, such a stereo image processing device is equipped with a pair of image-taking means and a stereo image processing LSI which applies the triangulation technique to a pair of picture images outputted from the above image-taking means. This stereo image processing LSI realizes the processing by the triangulation technique in such a manner that the picture elements contained in the pair of picture images are made to overlap each other to expose displacements (parallax differences) of the same spots between the two images. For successful processing, therefore, it is ideal that no displacement other than the parallax differences should exist between the pair of images. Each image-taking means should be well adjusted in advance so that there will be no displacement in relation to optical characteristics and signal properties. Also, positional relationship between cameras must be properly determined preliminarily.

In the vehicle-mounted environment, it is necessary to realize recognition and distance measurement of a long-distance object so as to meet with application requirements, for example, for detection of vehicles, walkers, and objects located anteriorly to find out in advance how to maneuver for safety.

The measuring distance Z is calculated by triangulation technique by the following formula, where $\delta$: parallax difference; f: focal length; and b: base-line length.

$$Z = b \cdot f / \delta$$

In finding the distance, the more distant the distance is, the smaller the parallax difference $\delta$ will become. For this reason, the farther an object is located, the more significant effect the object will have to the extent that an erroneous calculation even by one pixel will greatly affect the result and lower the accuracy. In other words, in order to obtain a better accuracy in terms of distance, it is important to use a high-resolution type image pickup device, thereby enhancing resolution power for parallax difference.

However, the use of a high-resolution type image pickup device will result in an increased load on image processing. One of the known methods to suppress the load on image processing is to process only a predetermined area out of the image data that the camera has put in the storage. See, for example, Japanese Patent No. 3018920.

However, since the method described in the patent document 1 has a fixed size of image area (which hereinafter may be referred to also as "window") predetermined as the processing area, it can process only a certain percentage of area of the picture image at any time. In detecting objects, detection of objects located at a far distance is important when driving at a high speed, while detection of objects located at short range is necessary when driving at a low speed. If a predetermined window is used disregarding such factors as speed and other driving conditions, there is a possibility that objects may not be included in the processing area and resultantly may not be detected.

SUMMARY OF THE INVENTION

The present invention has it as the objective to provide a stereo camera device that is able to detect objects depending on the driving environment with a capability of suppressing load on image processing.

To achieve the abovementioned objective, one aspect of the present invention is to provide a stereo camera device comprising a plurality of image-taking means, an image correction section which makes correction to the picture image taken, a parallax calculating section which calculates parallax, an amount of dislocation between the left and right images, and an image recognition section which carries out image recognition processing using both the image taken and the calculated parallax, or either of the two; the same camera device being also provided with a processing area setting up section which sets up the image area to be processed and reduction ratio respectively differently depending on the driving environment of the vehicle on which the above stereo camera device is mounted; in summary, by using the image area and the reduction ratio set up by the above processing area setting up section, the above image correction section makes correction to the picture image, the above parallax calculating section calculates parallax, and the above image recognition section carries out processing of image recognition.

With such configuration as explained above, it becomes possible to detect objects depending on the driving environment, while suppressing load on image processing.

With reference to the above aspect, preferably the above processing area setting up section is so designed that the image area to be processed and the reduction ratio are to be decided according to any conditions in the driving environment of the above vehicle, the conditions being such as forward drive or backward drive of the vehicle, steering wheel angle, speed of car, existence or non-existence of objects, turning speed of car, turning radius of car, daytime or nighttime, road configuration, or driving on expressway or ordinary road.

With reference to the above aspect, preferably only the data of the image elements in the processing area decided by the above processing area setting up section are to be transferred from the above image-taking means to the above image correction section.

With reference to the above aspect, preferably the above processing area setting up section is to set up a different processing area for each of the above plurality of image-taking means.

With reference to the above aspect, preferably the above processing area setting up section is to set up a processing area based on the result of the image recognition carried out by the above image recognition section.

With reference to the above aspect, preferably the above plurality of image taking means comprises the right camera placed on the right side of the vehicle and the left camera placed on the left side of the vehicle. The above processing area setting up section functions to slide the window position of the above left camera toward farther right than the window position of the above right camera.

With reference to the above aspect, preferably the above processing area setting up section is to set up a plurality of image areas or windows.

With reference to the above aspect, preferably the above processing area setting up section is to set different reduction ratios respectively for the above plurality of image areas.

The present invention makes it possible to detect objects depending on the driving environment and simultaneously to suppress load on image processing.

BRIEF DESCRIPTION OF THE DRAWINGS

FIG. 2 is a functional block diagram showing the configuration of the stereo camera device.

FIG. 13 is an another explanatory drawing concerning the image reduction in the processing area setting up section of the stereo camera device.

FIGS. 17A and 17B are other explanatory drawings concerning the window set up by the stereo camera device.

DESCRIPTION OF THE PREFERRED EMBODIMENTS

Explanation is given hereinbelow of the stereo camera device in regard to the configuration and the performance in reference to FIG. 1 to FIG. 10B.

Figure 1:
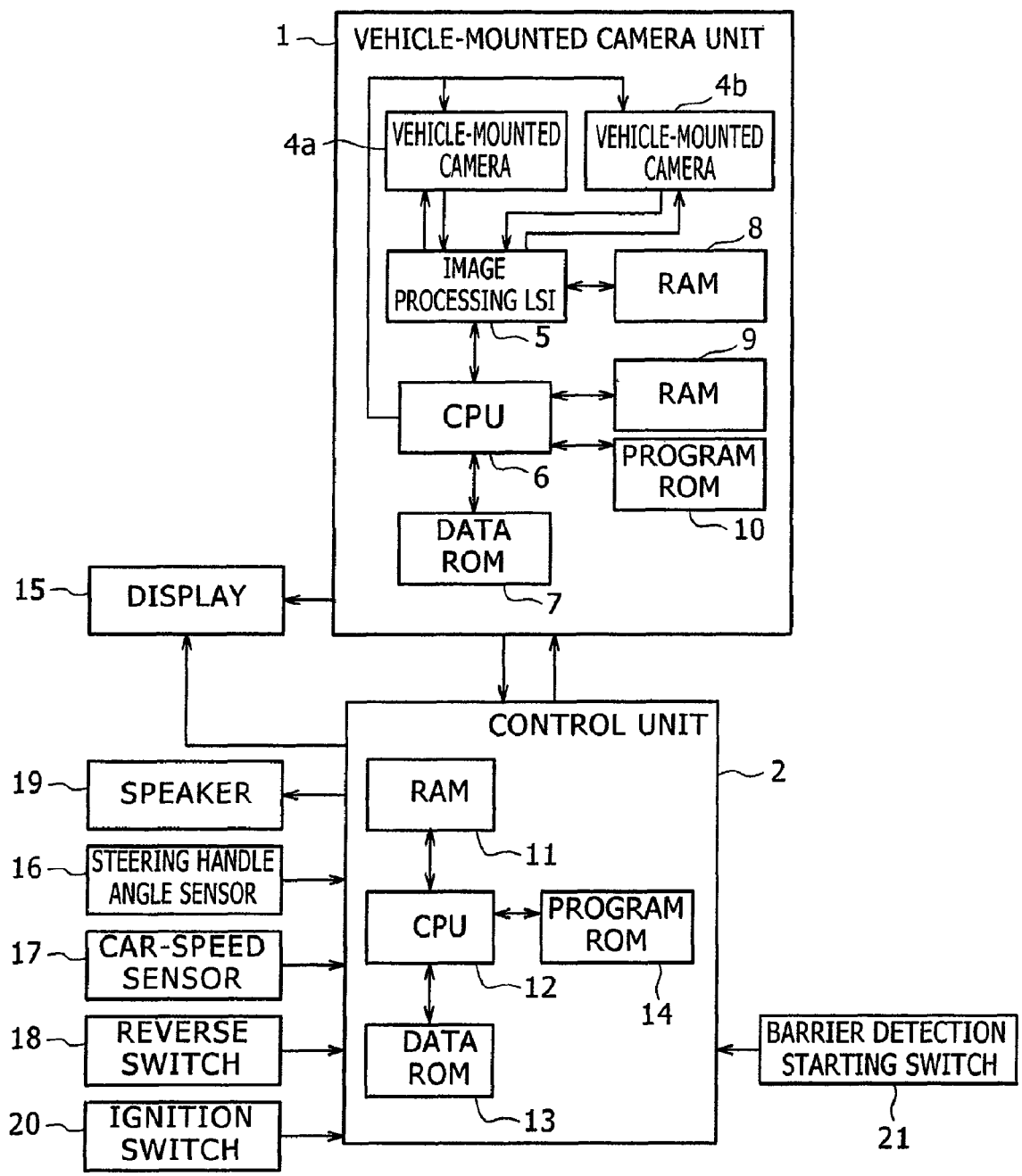
FIG. 1 is a system block diagram showing the configuration of the vehicle-mounted system using the stereo camera device.

In the beginning, FIG. 1 is referred to in explaining the configuration of the vehicle-mounted system of the stereo camera device according to the embodiment of the present invention.

FIG. 1 is a system block diagram showing the configuration of the vehicle-mounted system of the stereo camera device The vehicle-mounted system according to this embodiment is composed of the vehicle-mounted camera unit 1 and the control unit 2. The vehicle-mounted camera unit 1 is the stereo camera device according to this embodiment. The vehicle-mounted camera unit 1, by means of the vehicle-mounted cameras (image pickup device) 4a and 4b, recognizes the environment surrounding the vehicle (the subject vehicle) mounted with the vehicle-mounted camera unit 1. The vehicle-mounted cameras (image pickup device) 4a and 4b are, for example, the CCD image sensors having a high resolution of about multi-million pixels. The conventional stereo camera used to use image censors having a low resolution of about 300 thousand pixels. The above vehicle-mounted camera may well be provided in the number of three or more.

The control unit 2 is in charge of controlling the vehicle by detecting objects in the environment as recognized by the vehicle-mounted camera unit 1, notifying the attendant of possible risks, and guiding the vehicle to avoid risks.

The vehicle-mounted camera unit 1 comprises the vehicle-mounted cameras 4a and 4b both of which are fixed horizontally in parallel so as to take images of forward views of the subject vehicle, the image-processing LSI 5 which processes the images taken by the vehicle-mounted cameras, the CPU 6, the RAM 8 for the image-processing LSI, the RAM 9 for CPU, the program ROM 10, and the data ROM 7.

The control unit 2 comprises the CPU 12, the RAM 11, the program ROM 14, and the data ROM 13, all of which are so configured as to be connected by way of the bus. The CPU 6 controls overall operations of the system by executing each of various control programs stored in the program ROM 4.

The vehicle-mounted camera unit 1 has the program ROM 10 which stores the object detection program. The CPU 6 carries out the program to realize the object detection functions.

Also in regard to the vehicle-mounted system, the vehicle-mounted camera unit 1 is connected with the control unit 2 and further connected to the display 15 which is installed inside the vehicle to display various images and data. The control unit 2 is connected to the speaker 19 which generates vocal alerting in case the subject vehicle is involved with the risk of colliding against some objects, the car-speed sensor 17, the steering wheel angle sensor 18, the reverse switch 18 which is turned on when the vehicle moves backward, the ignition switch 20 which is turned on when the engine is started, and the object detection starting switch 21. The control unit 2 controls the overall operations of the subject vehicle-mounted system, commencing with the control of display on the display 15.

The vehicle-mounted camera unit 1 is installed, for example, in the position of the room mirror inside the subject vehicle, taking picture images in such a mounting location and in such a descending vertical angle as to command a forward view of the subject vehicle. The images (stereo images) of the forward view of the subject vehicle taken by the vehicle-mounted camera 4a and the vehicle-mounted camera 4b are supplied to the image-processing LSI 5 and the CPU 6 inside the vehicle-mounted camera unit 1 for the purpose of image recognition.

When the control unit 2 judges, based on the information such as locations and relative approaching speed of objects recognized by the vehicle-mounted camera unit 1, that the subject vehicle has a possibility of getting into a collision with objects, the control unit 2 issues instructions to either the display 15 or the speaker 19 or both of them to give warning to the driver. The control unit 2 may as well add such controls as maneuvering of brake and steering operations of the vehicle so as to avoid collision or cushion the impact of collision.

The display 15 is composed of, for example, an LCD (liquid crystal display) and other display devices. The display 15 is controlled for display by the control unit 2 to display, for example, images of navigation-guided driving route guidance (not shown in the drawing), images from the vehicle-mounted camera unit 1, and other images. Under the control of the control unit 2, this display 15 also displays the message alerting the attendants to the existence of objects when any objects are detected by the control unit 2.

The object detection starting switch 21 can be turned on or off by the driver. If the object detection starting switch 21 is turned on, the vehicle-mounted camera unit 1 starts object detection operation under control of the control unit 2. The driver can turn on the object detection starting switch 21 whenever he feels he might become less alert in recognizing existence of objects, for example, for or during long distance drive or nighttime drive. It may as well be possible to keep the vehicle-mounted camera unit 1 always active in controlling and carrying out object detection without outfitted with the object detection starting switch 21.

Figure 4:
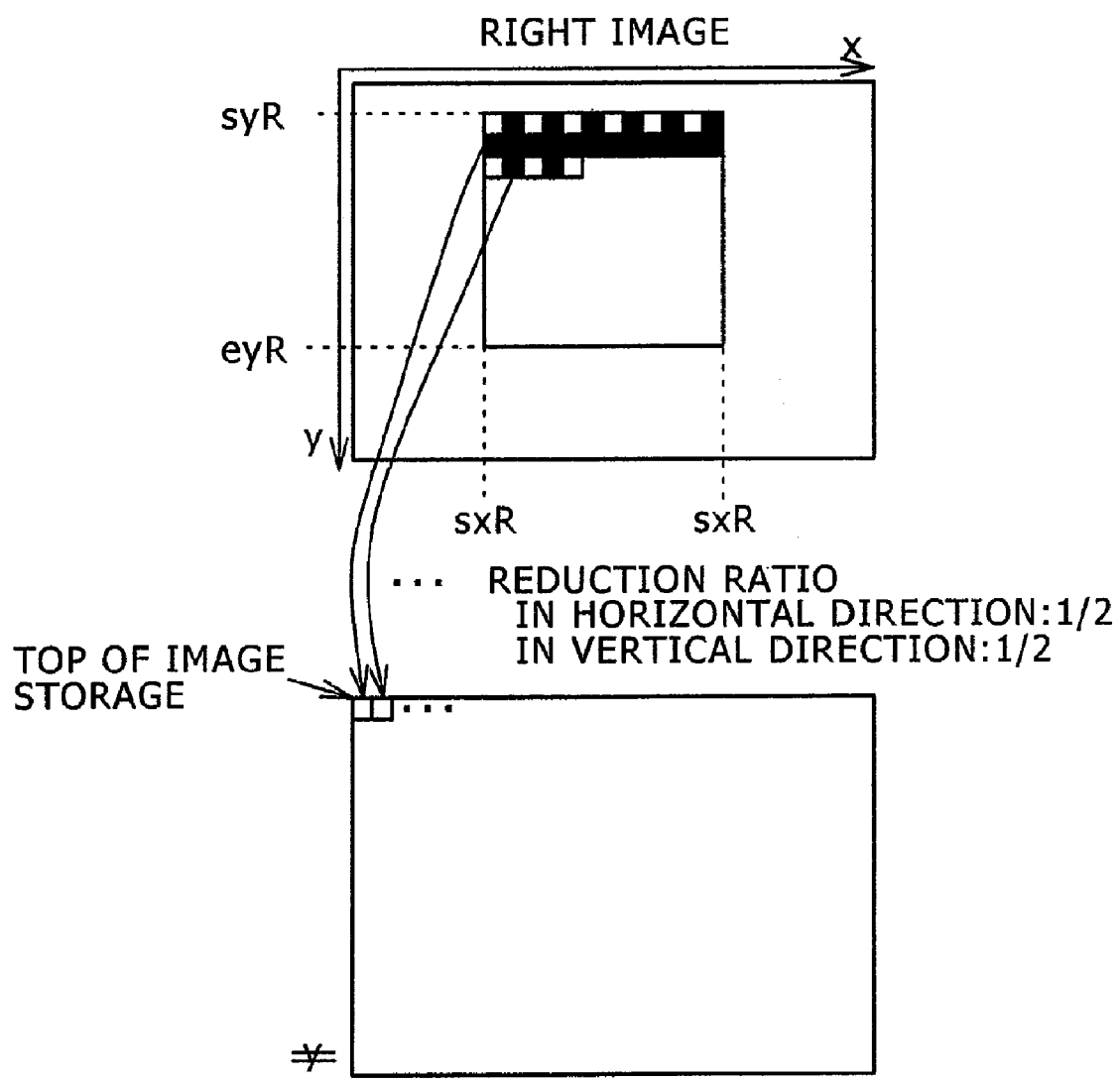
FIG. 4 is an explanatory drawing concerning an example of image reduction processing based on the reduction ratio set up by the processing area setting up section of the stereo camera device.

With reference to FIG. 2 and FIG. 4, explanation is made of the performance of the stereo camera device according to the present embodiment.

Figure 3A:
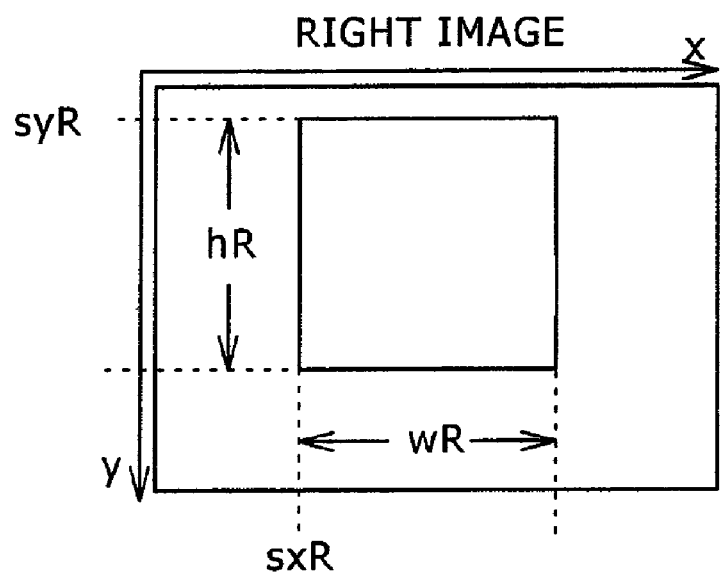
FIGS. 3A and 3B are explanatory drawings concerning the window used in the processing area setting up section.
Figure 3B:
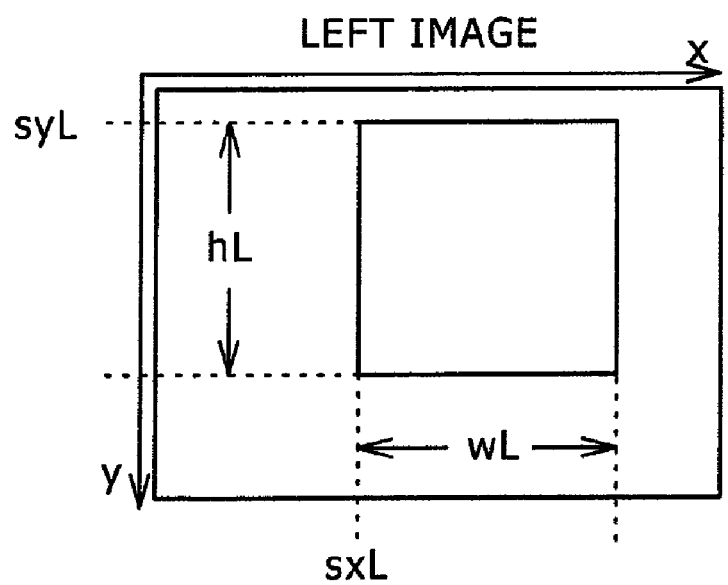

FIG. 2 is a functional block diagram showing the configuration of the stereo camera device. FIGS. 3A and 3B are explanatory drawings concerning the window that is used in the processing area setting up section of the stereo camera device. FIG. 4 is an explanatory drawing illustrating an example of reduction processing in accordance with the reduction ratio set up by the processing area setting up section of the stereo camera device.

The image processing LSI 5 and the CPU 6 of the vehicle-mounted camera unit 1 are, function-wise, composed of the processing area setting up section 30, the image correction section 31, the parallax calculating section 32, and the image recognition section 33.

The processing area setting up section 30 is to select the area of image elements (processing area) to be brought in from the cameras 4a and 4b on the basis of the data on car speed from the car-speed sensor 17, the data of the steering wheel angle from the steering wheel angle sensor 16, and the on-off data of the reverse switch 18.

As the data concerning the processing area to be set up by the processing area setting up section 30, windows can be set up independently for the right image and for the left image, as shown in FIGS. 3A and 3B. These windows are designated by the window starting position for the right image (sxR, syR) and the window size (hR, wR), and the window starting position for the left image (sxL, syL) and the window size (hL, wL).

Also, the processing area setting up section 30 can set up reduction ratios, the ratio by which to reduce the image, independently for the right and the left. The reduction processing is conducted in such a way that in the case of reduction ratio being 1/2, every other image elements are transferred. In the case of the reduction ratio being 1, all the image elements are transferred without any reduction. Likewise, in the case of the reduction ratio being 1/3, transfer is made of every three image elements. The reduction ratio can be set up at any ratio, namely at 1/n.

With regard to the images transferred from the vehicle-mounted cameras 4a and 4b in accordance with the processing area set up by the processing area setting up section 30, the image correction section 31 makes various corrections in distortion of lens, mounting location of the cameras, any errors of mounting angle, and other errors and differences by using a lookup table prepared with calibration done in advance.

The parallax calculating section 32 uses either image, left or right, outputted from the image correction section 31 as the standard and searches for corresponding points on the other image by means of template matching, to find and map out parallax existing between each image element on the standard image and the corresponding points on the other image.

The image recognition section 33 recognizes the images using both the images outputted from the image correction section 31 and the parallax map outputted from the parallax calculating section 32, or either of the two. At the same time, the assumed distances to the objects are also to be calculated.

As described above, the vehicle-mounted camera unit 1 configured as above finds out parallax with the CPU 6 carrying out the program and further conducts all other stereo image processing up to recognition of objects within the vehicle-mounted camera unit 1. The result of recognition is transmitted to the control unit 2, and when it is judged under the control of the control unit 2 that there is a possibility of collision risk, control is made either to diminish or avoid the collision or to generate a warning sound to alert the attendants of the vehicle to the approaching risk.

The operation of the stereo camera device according to the present embodiment is explained below with reference to FIG. 5 to FIG. 9.

FIG. 5 to FIG. 9 are the flow charts showing the performance of the stereo camera device.

Figure 5:
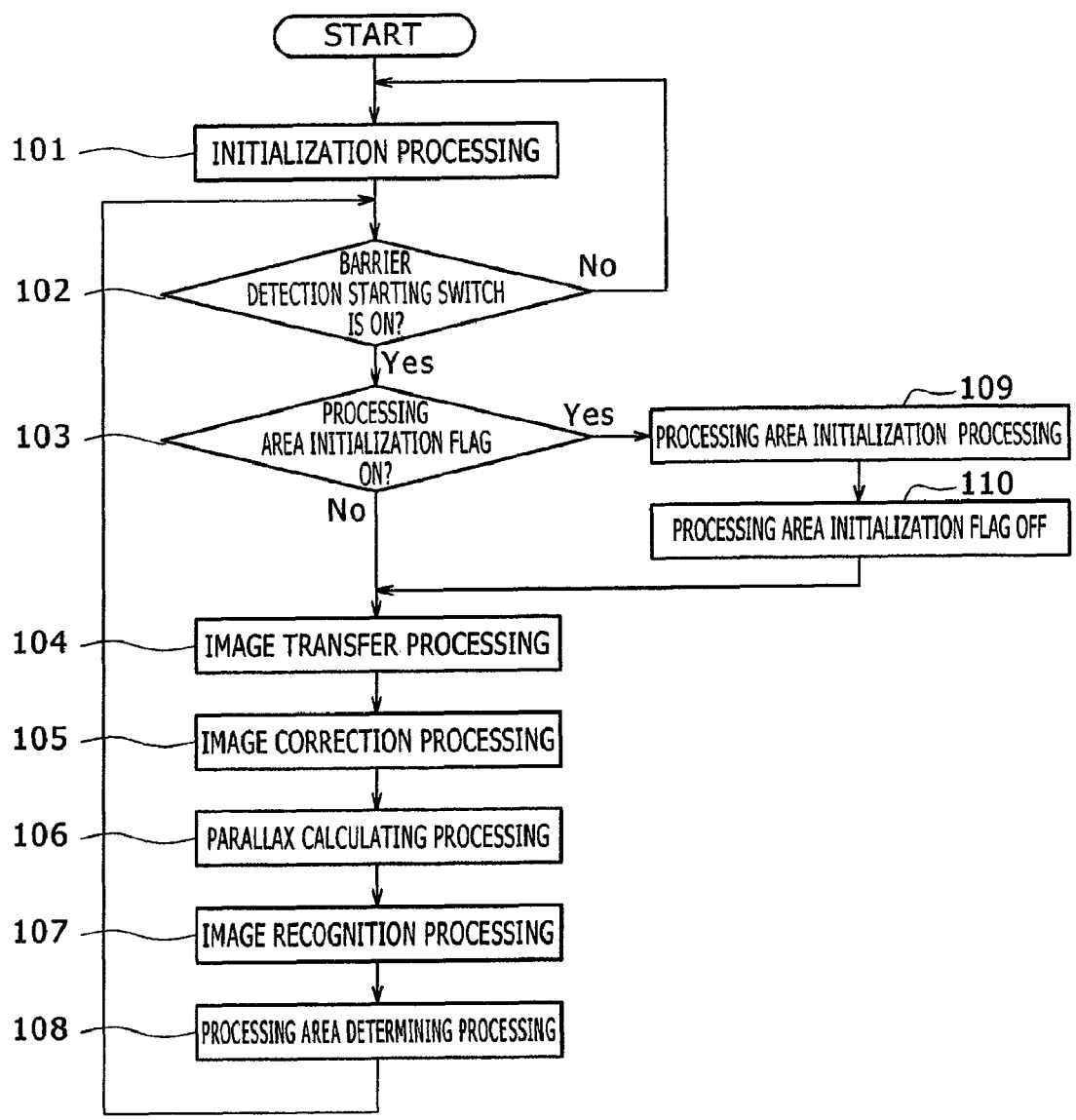
FIG. 5 is a flowchart showing the performance of the stereo camera device.

The processing sequence up to image recognition by the vehicle-mounted camera unit 1 is explained hereunder with reference to the flow charts The sequence of processing shown in FIG. 5 starts when the ignition switch 20 is turned on and is to be carried out repeatedly until the ignition switch is turned off. The foregoing processing is to be carried out regardless of whether the subject vehicle is running or parked, or whether the picture image exhibited on the display 15 is the driving route guiding image of the navigation system or any other type of image.

When the ignition switch 20 is turned on to start with, the initialization processing of the image processing LSI 5 is performed (Step 101). During this initialization processing, the flag for the processing area initialization is set "ON" as the default value.

In the next place, judgment is made whether the object detection starting switch 21 is on or not (Step 102).

When the object detection starting switch 21 is put to ON judgment is made whether the processing area initialization flag is ON or not (Step 103). If the processing area initialization flag is ON, the processing area is initialized (Step 109). At the same time, the window is to be set up so as to encompass the whole picture image covered in the shooting. And, the initialization flag is set to OFF (Step 110).

And, the vehicle-mounted cameras 4a and 4b take picture images of the views spreading anteriorly to the vehicle and transfer the same image elements in accordance with the pre-set processing area to the image processing LSI of the vehicle-mounted camera unit 1 (Step 104: image transfer processing).

After that, the image processing LSI makes correction of the luminance value of the images as well as distortions of the left and right images respectively (Step 105: image correction processing). Actually, image correction processing is executed in the image correction section explained in FIG. 2, the details of which are going to be described in reference to FIG. 6 afterward.

Then, either of the left or right image is decided to be the standard image and the other image to be the comparative image. The image elements corresponding to those in the standard image are searched for in the comparative image, and the parallax between the image element in the standard image and in the comparative image is obtained for each image element to create a parallax map (Step 106: parallax calculating processing). The parallax calculating processing is executed in the parallax calculating section 32, the details of which are going to be explained in reference to FIG. 7 afterward.

The parallax map thus obtained and the standard image are used to conduct object detection processing (Step 107: image recognition processing). Additionally, the above image recognition processing is executed in the image recognition section 33, the details of which are going to be described in reference to FIG. 8 afterward.

Furthermore, next processing area is to be decided and set up on the basis of car speed and steering wheel angle (Step 108: processing area setting up processing). Additionally, the processing area setting up processing is going to be executed in the processing area setting up section 30 explained in FIG. 2, the details of which are going to be described in reference to FIG. 9 afterward.

With reference to FIG. 6 to FIG. 9, explanation is made of each processing from Step 105 to Step 108.

Figure 6:
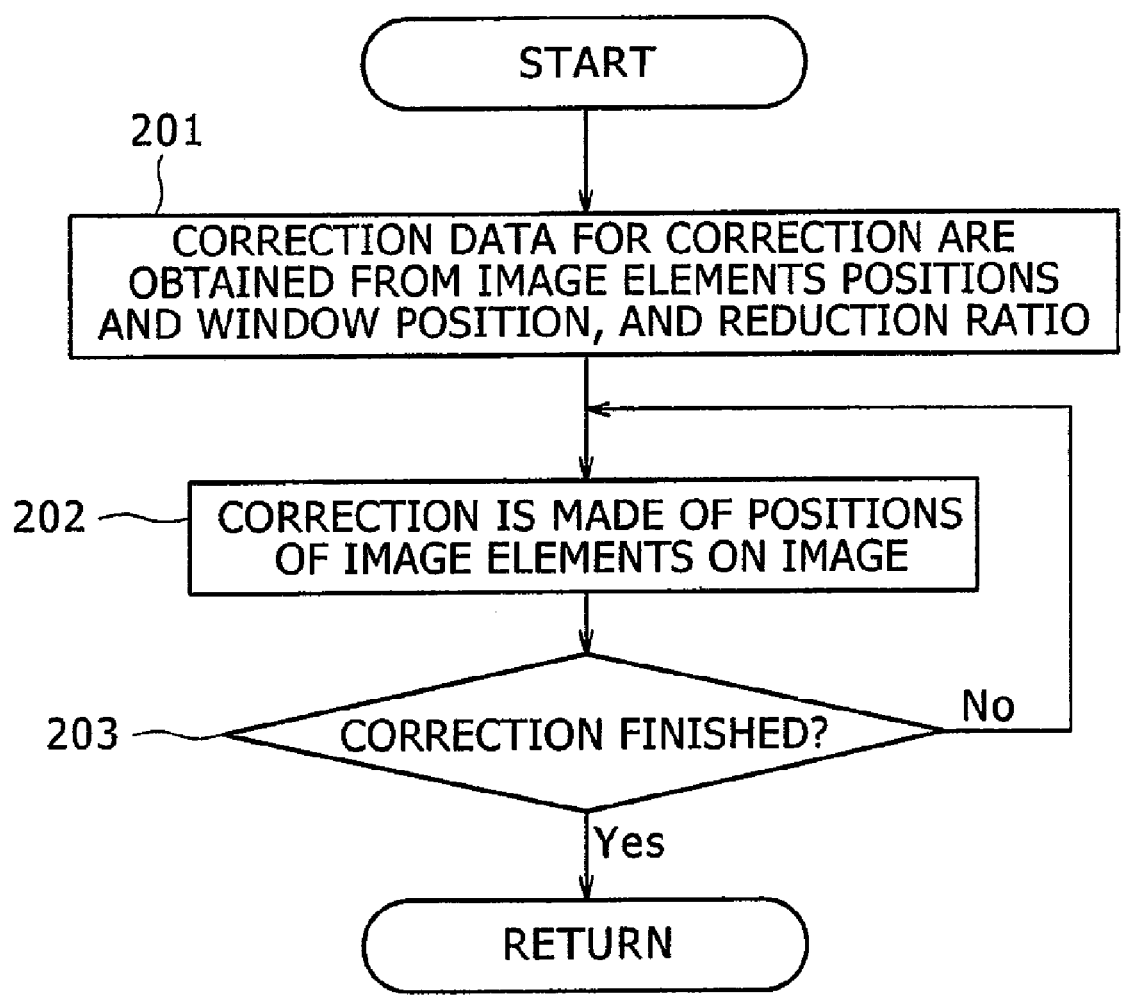
FIG. 6 is a flowchart showing the performance of the stereo camera device.

As shown in FIG. 6, the image correction section 31 calculates the location of an image element on the image pickup device on the basis of the location of the image of correction target, and the position, size, and reduction ratio of the processing area window, and obtains necessary correction data from the correction data table (Step 201). In this connection, the correction data table was preliminarily made up with calibration processing and stored in the data ROM 7, and through the initialization processing at Step 101 in FIG. 5, it is now loaded in the RAM 8.

Next, from the correction data received, the corrected location of the image element is obtained (Step 202), and judgment is made if all the image elements have been corrected or not (Step 203). The same processing is to be repeated until corrections of all the image elements have been completed.

Figure 7:
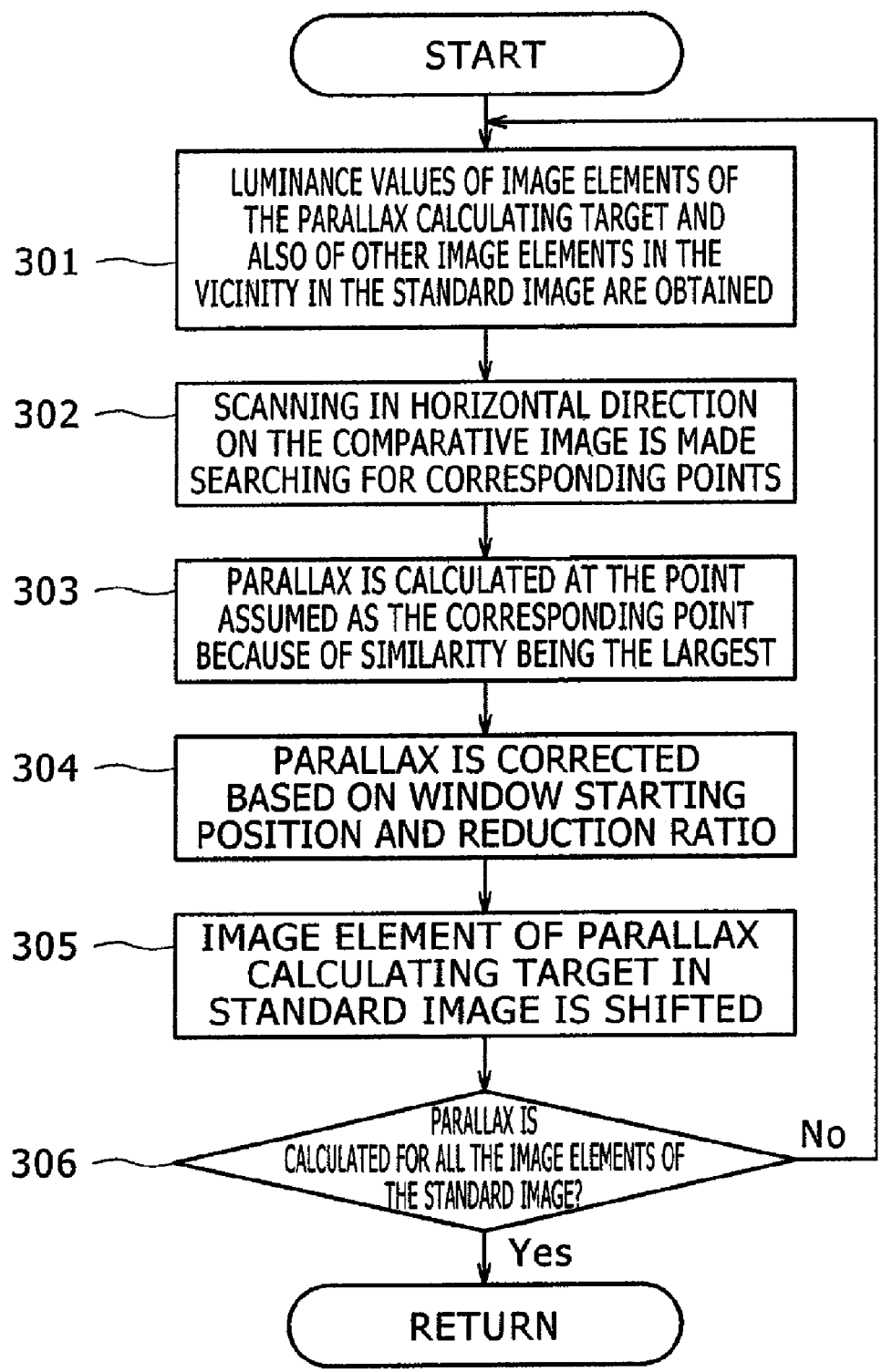
FIG. 7 is a flowchart showing the performance of the stereo camera device.

As shown in FIG. 7, the parallax calculating section 32 obtains the luminance values of the image elements of the parallax calculating target and also of the other image elements in the vicinity in the standard image (Step 301) and conducts processing of comparison between the above luminance values and the luminance values in the comparative image while scanning in the horizontal direction (Step 302). In this case, scanning only in the horizontal direction is enough, since the vehicle-mounted cameras 4a and 4b are fixed in parallel in the horizontal direction, while necessary corrections of distortions and fixing errors are well taken care of in the image correction section. Thus, parallax is measured at the point where similarity is the greatest (Step 303).

In the next place, parallax is corrected on the basis of the position of the window and the reduction ratio of the processing area (Step 304), with shifting of the image elements of the parallax calculating targets in the standard image (Step 305).

Lastly, judgment is made as to whether parallax is calculated for all the image elements of the standard image (Step 306), and processing should be repeated in case calculation of parallax has not been finished.

Figure 8:
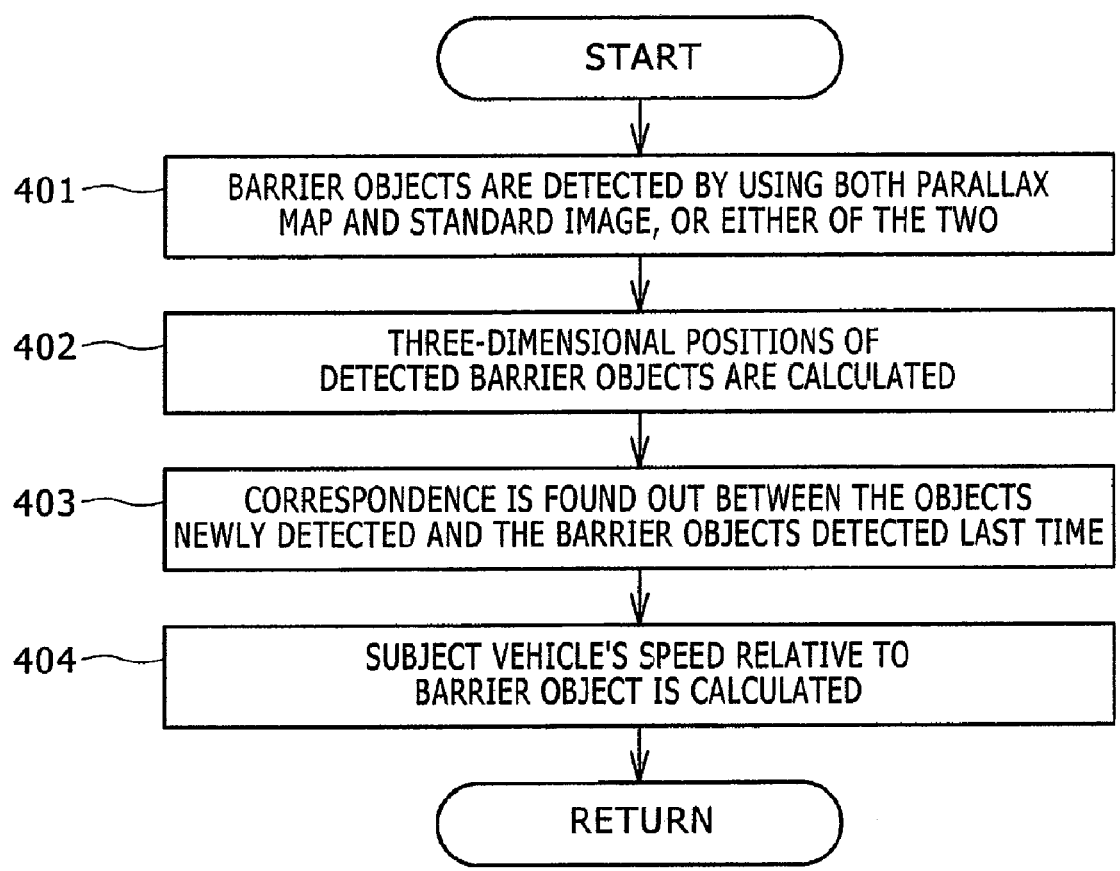
FIG. 8 is a flowchart showing the performance of the stereo camera device.

Next, as shown in FIG. 8, the image recognition section 33 is to detect possible objects using both the parallax map and the standard image, or either of the two (Step 401). In the above processing, three-dimensional positions are calculated by using the parallax and from the positions of the image elements in the standard image. For this purpose, the positions of the image elements on the image pickup device become necessary and need to be worked out from the positions, size, and the reduction ratio of the window of the processing area.

Then, the three-dimensional positions of the detected objects are ascertained (step 402), and corresponding relations between the objects newly detected and the objects detected last time are found out (Step 403). The relative vehicle speed is calculated based on such correspondence result and the three-dimensional position (Step 404).

Figure 9:
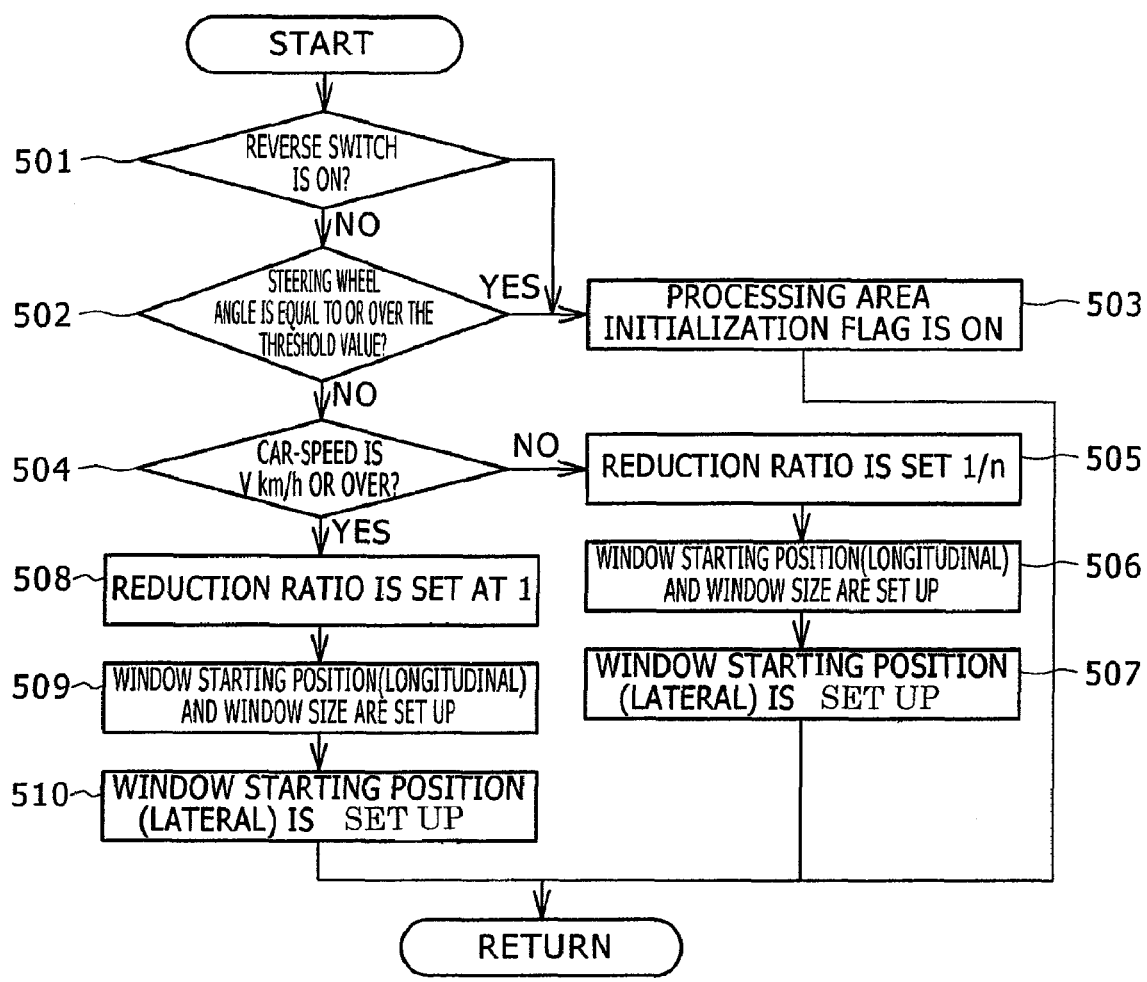
FIG. 9 is a flowchart showing the performance of the stereo camera device.

Then, as shown in FIG. 9, the processing area setting up section 30 makes judgment as to whether the reverse switch is ON or not (Step 501), and if the switch is ON, the processing area initialization flag is set ON (Step 503), after which processing returns from the current procedure.

Then, judgment is made as to whether the steering wheel angle is equal to or over the threshold value (Step 502). If the steering wheel angle is equal to or over the threshold value, the processing area initialization flag is set ON (Step 503), after which processing returns from the current procedure.

If the steering wheel angle is below the threshold value at Step 502, judgment is made as to whether or not the driving speed of the subject vehicle is V km/h or over (Step 504). In case of the speed being below V km/h, the reduction ratio is set at 1/n (Step 505), and set-up is made for the starting position and size of the longitudinally-arranged picture image window the use of which is predetermined in case of the speed being below V km/h (Step 506). After that, setup is also made for the starting position (sxR and sxL) of the laterally-arranged window the use of which is preliminarily defined in relation to the steering wheel angle (Step 507).

In case the driving speed is judged V km/h or over at Step 504, the reduction ratio is set at 1 (Step 508), and set-up is made for the starting position (syR and syL) and size (hR, wR, hL, and wL) of the longitudinally-arranged picture image window the use of which is predetermined in case of the speed being V km/h or over (Step 509).

After that, setup is made for the starting position (sxR and sxL) of the laterally-arranged window the use of which is preliminarily defined in relation to the steering wheel angle (Step 510).

Figure 10A:
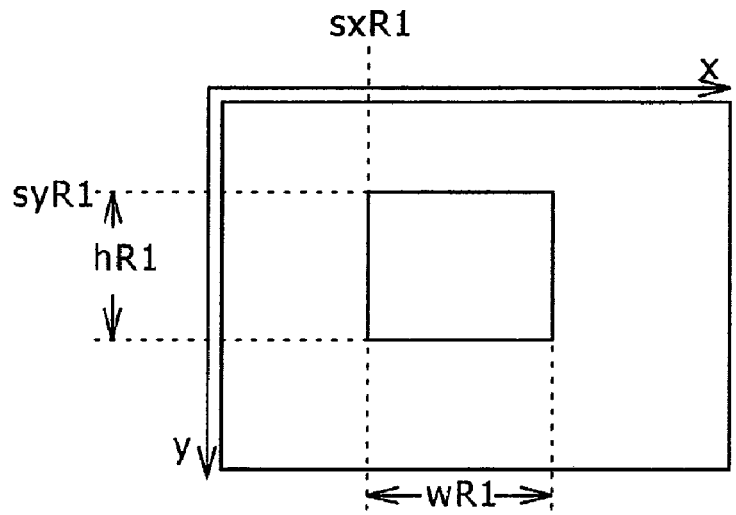
FIGS. 10A and 10B are explanatory drawings concerning the window set up by the processing area setting up section 30 of the stereo camera device.
Figure 10B:
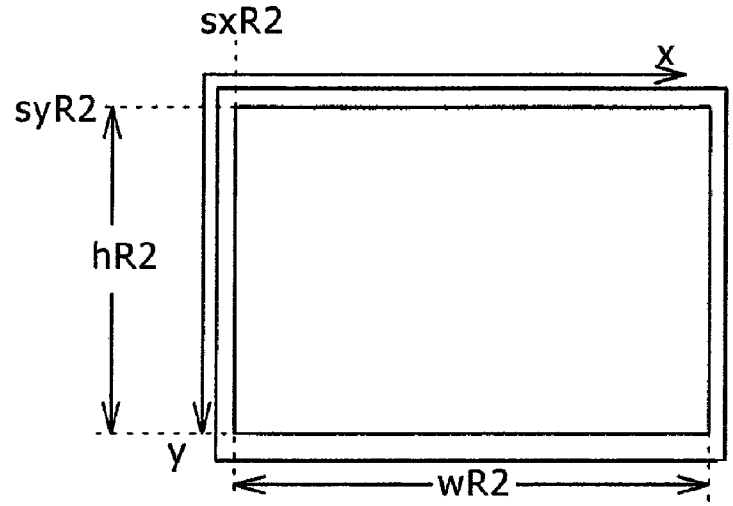

Now, in reference to FIGS. 10A and 10B, explanation is made of an example of the window set up by the processing area setting up section 30 of the stereo camera device according to the present embodiment.

FIGS. 10A and 10B are explanatory drawings of an example of the window set up by the processing area setting up section 30 of the stereo camera device.

FIG. 10A shows the processing area for the right picture image in the case of high driving speed (V km/h or over). The window is designated by the window starting position (sxR1, syR1) and the window size (hR1, wR1).

FIG. 10B shows the processing area for the right picture image in the case of low driving speed (below V km/h). The window is designated by the window starting position (sxR2, syR2) and the window size (hR2, wR2).

In short, at the time of high-speed driving, the processing area is set up only in around the center of the picture plane as shown in FIG. 10A. On the other hand, at the time of low-speed driving, the entire picture plane is set up as the processing area as shown in FIG. 10B. The processing area shown in FIG. 10B is at once used as the processing area for the time of backward drive or right or left turn.

The processing area at the time of high-speed driving is 10%-20% of the entire picture plane for the time of low-speed driving. For example, when the number of pixels of the image pickup device is 5000 thousand pixels, the number of pixels is 2,560 pixels in x direction and 1,920 pixels in y direction. And, the area of the window at the time of high-speed driving is made, for example, to be ⅑ (11%)

Assume that the processing area at the time of low-speed driving as shown in FIG. 10B has the window starting position (sxR2=0, syR2=0) and the window size (hR2=1920, wR2=2560) as designated in the parenthesis, and the processing area at the time of high-speed driving as shown in FIG. 10B will have the window starting position (sxR2=853, syR2=640) and the window size (hR2=853, wR2=640) as designated in the parenthesis. The number of pixels (image elements) in the window at the time of high-speed driving will be 853 pixels×640 pixels, that is, approximately 550 thousand pixels. On the other hand, the number of pixels in the window at the time of low-speed driving is 5,000 thousand pixels. As this pixel count as it is, is too large in amount of image data to be transferred, or processed, the reduction ratio (1/n) is to be set at 1/3. In the example with which FIG. 4 was explained, the reduction ratio was made 1/2, but if the reduction ration is made 1/3, it becomes possible to transfer the data every three pixels, the transferred number of pixels thus amounting to 853 pixels×640 pixels, that is, approximately 550 thousand pixels. In other words, it is possible to make even the number of pixels for transfer and processing at the time of high-speed driving and low-speed driving. An amount of data for approximately 550 thousand pixels is nearly twice as much as some 300 thousand pixels of a conventional image pickup device, and this amount level of data is easy for an image processing LSI and other devices to process. Moreover, at the time of high-speed driving, selecting only the central part of the picture plane makes it possible, for example, to obtain the image of the forward vehicles running speedily with a high resolution and to enhance limit of resolution of parallax. On the other hand, at the time of low-speed driving, there is a necessity of recognizing signs on both sides of the road, pedestrians, bicycles, etc. as well as forward running vehicles. Widening the area of the window is useful for preventing omission in detecting these objects. In this connection, signs, pedestrians, bicycles, etc., are large enough to be recognizable even if image element data are reduced in volume.

Additionally, at the time of high-speed driving and when the steering wheel angle is the threshold value or below (in short, in case the angle is not so wide as to make a right or left turn but just enough for straight driving or lane-changing), the starting position of the window can be changed according to the steering wheel angle as explained for Step 507. To be concrete, when the steering wheel angle is zero or thereabout, it means the vehicle is moving forward and the window starting position (sxR2=853, syR2=640) and the window size (hR2=853, wR2=640) are set as designated in the parenthesis. When the steering wheel angle is about 10 degrees right, the window starting position (sxR2=953, syR2=640) is set as designated in parenthesis, and when the steering wheel angle is about 20 degrees right, the window starting position (sxR2=1053, syR2=640) is set as designated in parenthesis; that is, the starting position is set up a little to the right than before according to the amount of angle of the steering wheel. This facilitates, for example, recognition of vehicles running on the right-side lane in parallel with the own vehicle as the object.

Also, at Steps 507 and 510, the window position of the left image in relation to the window position of the right image may well be placed on the right side in the picture plane. If the parallax searching range is 100 pixels, the parallax obtainable is limited only to 100 pixels, but if the window of the left image is placed toward the right side by "d" pixels, it becomes possible to find out parallax to the extent of (100+"d") pixels. If parallax needs to be obtained only within a predetermined distance of "x" meters, it is just enough to slide the left window to the right by the parallax of the objects located within the distance of "x" meters. In this manner, it becomes possible to see a nearer object than could have been seen before the window position changed from being able to view an object located "x" meters ahead of the nearer object.

In the place of the steering wheel angle sensor 16, a yaw rate sensor for detecting the rotating speed of the subject vehicle may be used to acquire similar effect in setting up the processing area.

From the steering wheel angle and the driving speed available from the steering wheel angle sensor 16 and the vehicle speed sensor 17 respectively, turning radius of the subject vehicle is found out, and based on such turning radius, the processing area may as well be set up. The turning radius rs can be calculated by the following formula, where δ denotes the output from the steering wheel angle sensor and V denotes vehicle speed.

$$rs = (1 + A\ V^2) \times 1/\delta$$

$$\delta = \alpha \times \delta h$$

Where:
A=stability factor
l=wheel base
α=steering gear ratio
δh=steering wheel angle
These are all innate values in a vehicle.

If the turning radius is large, the window is to be set up in around the center of the picture plane, and if the turning radius is small, it is preferable to set up the window in the location slightly moved from the center of the picture plane to the right of the center. With such setup, it becomes possible to recognize the objects existing in the direction into which the subject vehicle is being turned around when to pass through curves and intersections.

In case the subject vehicle is equipped with a car navigation system or any other devices providing time information, it is also possible to set up the processing area on the basis of the time information. During nighttime, insufficiency in lighting intensity may cause difficulty of stable taking of images of objects in distance, and therefore, it is desirable to treat objects in short range and in a wide sphere.

By having the car navigation system and the cartographic database installed in the system, it becomes possible to find out the configuration of the road the subject vehicle is running along and the road category as to whether it is an expressway or an ordinary road, on the basis of the present location of the vehicle available from the car navigation system and the cartographic data supplied from the cartographic database, and based on the foregoing information of road configuration and road category, to decide on the processing area. Because of the above support, when the vehicle is clearing a bend, the direction toward which the road is curving can be chosen as the processing area, an efficient way of setting up the processing area. The processing area for long distance can be set for driving along an expressway, and the processing area for short range can be set for driving an ordinary road.

Configuration may as well be arranged in such a way that the control unit 2, a unit independent from the vehicle-mounted camera, imports images from the vehicle-mounted cameras 4*a* and 4*b* and carries out setting up of the processing area and the image recognition processing, while the processing area is set up on the vehicle-mounted cameras 4*a* and 4*b*

According to the present embodiment as explained above, to be transferred are only those images, out of those taken with the vehicle-mounted camera 4*a* and the vehicle-mounted camera 4*b*, that match with the processing area set up by the processing area setting up section, permitting speeding-up of image transfer processing.

Since the above processing is made by the image correction section, the parallax calculating section, and the image recognition section using the information of the processing area, the image cutout processing and the image reduction processing both for setup of the window allow calculating the original positions of image elements, which further allows finding out accurate parallax and three-dimensional positions.

Therefore, even when an image pickup device of high resolution is used, it is possible to reduce load of transfer and processing of image data and to carry out the stereo processing and image recognition processing in real time. Furthermore, as the extent of the image data to be transferred is decided on the basis of the image recognition result etc., it is possible to detect objects effectively no matter whether it is located long distance or short range away.

Whether the processing area setting up section of the system is working normally or not can be ascertained by checking the image data in the RAM 9 as to whether or not changes are observed in the images to be transferred according to changes in car-speed, handle angle, and actuation of the reverse switch.

By turning the processing area initialization flag ON in case the reverse switch 19 is ON at Step 501, it is possible to process a wide range of images when the vehicle moves backward. The foregoing processing is effective, because at the time of backward movement of the vehicle, detection needs to target the objects within only a short range and in a wide sphere.

When the vehicle makes a right or left turn, it is highly possible that preceding cars and other objects may not be caught in the processing area. Also, since any objects located far away in the image have little risk for the subject vehicle to collide with, the objects existing in short range can only be targeted. At Step 502, therefore, whether right turn or left turn is detected from the handle angle to initialize the processing area.

When the car-speed of the subject vehicle is slow, the risk of collision against any distant object is small enough to permit setting-up the processing area which is able to detect objects in short range and in a wide sphere. When the car-speed is fast to the contrary, a predetermined area is to be processed with a high resolution thereby enabling detection of distantly located objects. For this purpose, it is effective that the car-speed is judged at Step 504 so as to change over the processing area.

Next, with reference to FIG. 11 to FIG. 18B, explanation is made of the configuration and performances of the stereo camera device according to another embodiment. The configuration of the vehicle-mounted system utilizing the stereo camera device according to this embodiment is similar to the one shown in FIG. 1.

Figure 11:
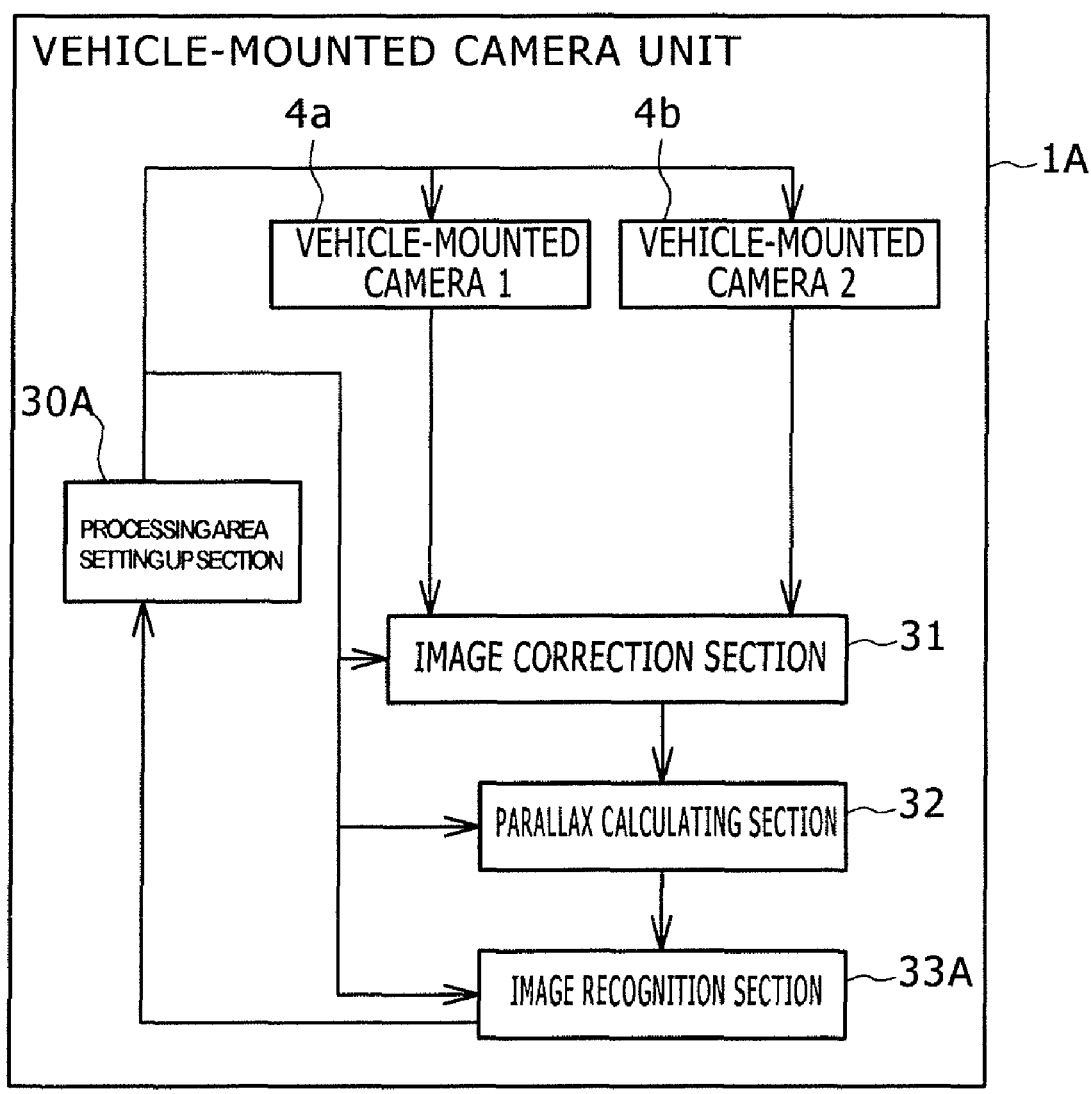
FIG. 11 is an another functional block diagram showing the configuration of the stereo camera device.
Figure 14A:
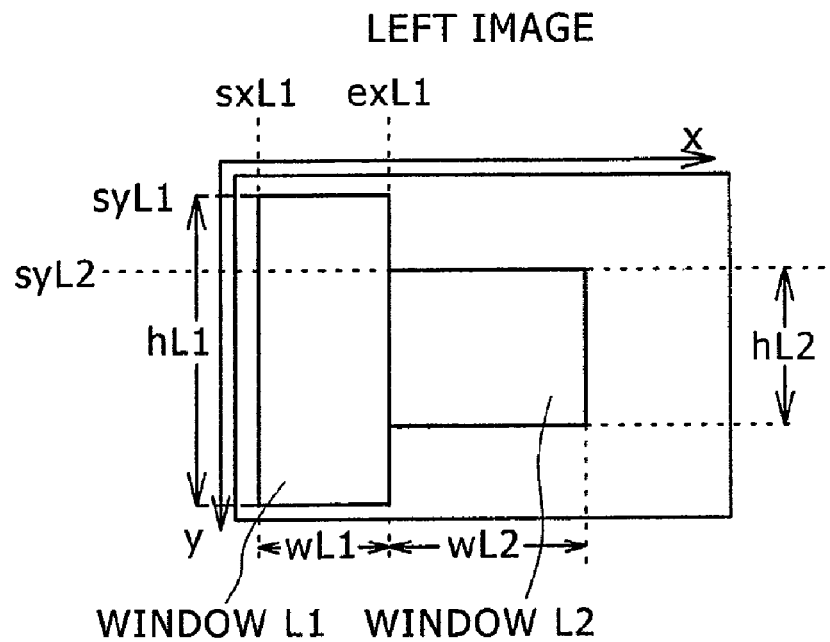
FIGS. 14A and 14B are other explanatory drawings concerning the window used in the processing area setting up section of the stereo camera device.
Figure 14B:
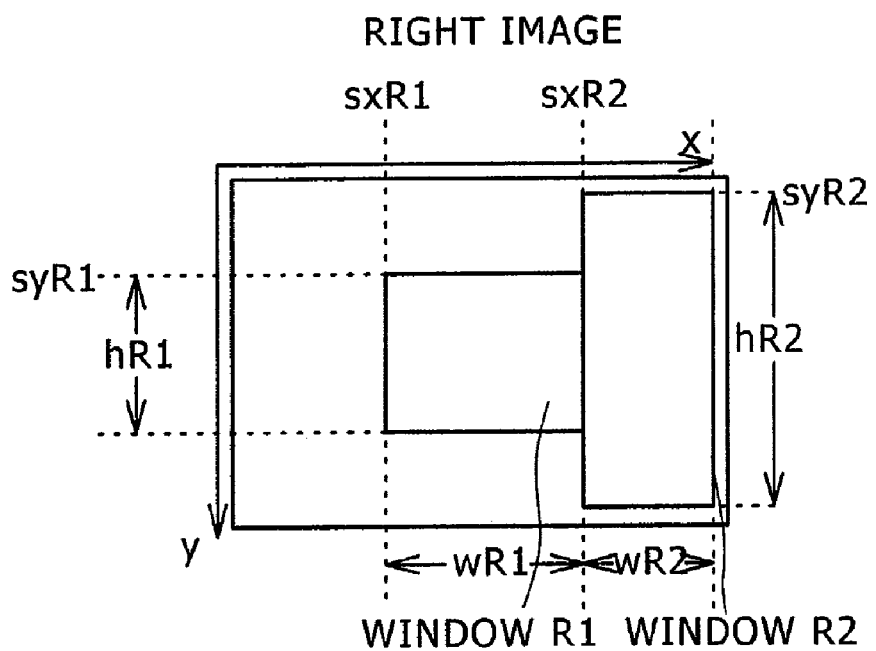

Hereafter, FIG. 11 to FIG. 14B are used to explain about the performances of the stereo camera device according to the present embodiment FIG. 11 is another functional block diagram showing the configuration of the stereo camera device. Any reference numerals used in FIG. 11 which are the same as those used in FIG. 1, denote the same parts. FIGS. 12A and 12B are other explanatory drawings explaining about the window used in the processing area setting up section of the stereo camera device. FIG. 13 is an another explanatory drawing explaining about the reduction processing in the processing area setting up section of the stereo camera device. FIGS. 14A and 14B are other explanatory drawing explaining about another example of the window used in the processing area setting up section of the stereo camera device.

According to the present embodiment, the image processing LSI 5 and the CPU 6 of the vehicle-mounted camera unit 1A are composed function-wise, as shown in FIG. 11, of the processing area setting up section 30A, the image correction section 31, the parallax calculating section 32, and the image recognition section 33A. The processing area setting up section 30A sets up the processing area by using the processing result from the image recognition section.

Figure 12A:
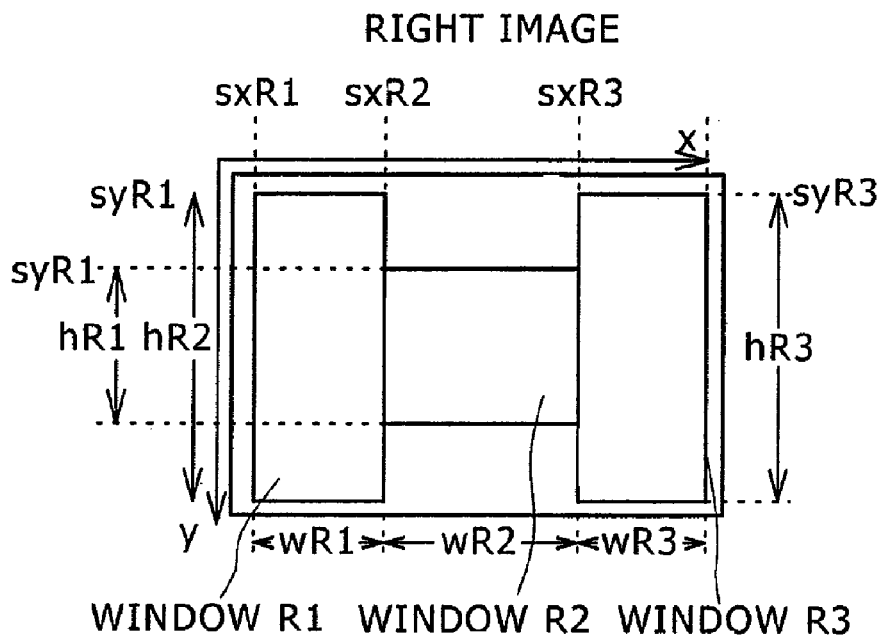
FIGS. 12A and 12B are other explanatory drawings concerning the window used in the processing area setting up section of the stereo camera device.
Figure 12B:
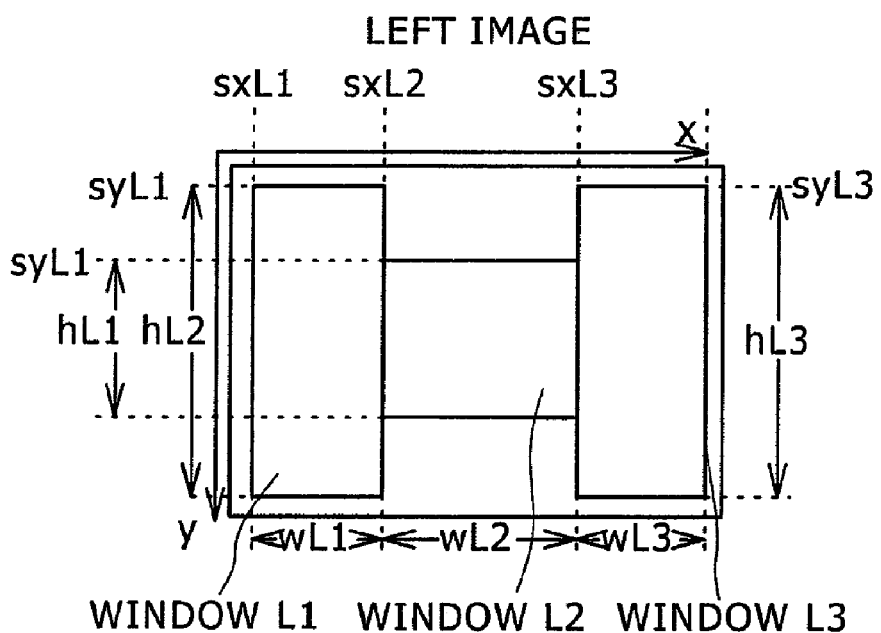

The processing area setting up section 30A, on the basis of car-speed, handle angle, information whether the reverse switch is ON or OFF, and the image recognition result at the current time "t", selects image elements to be taken in from the camera at next processing time "t". At that time, it is possible to designate a plurality of windows as shown in FIGS. 12A and 12B. At the same time, it is also possible to set up different reduction ratios for respective windows. Assuming that windows are set up as shown in FIGS. 12A, 12B and that the reduction ratios for the window R2 and the window R3 are set at 1/2 of that for the window R1, the picture image is to be stored in the image storage as shown in FIG. 13. Further, as shown in FIGS. 14A and 14B, it is as well possible to set up left-right unsymmetrical windows R2 and L2. Because the windows R2 and L2 are left-right unsymmetrical, detection of parallax is not possible in the other areas than the window R1, but the windows R2 and L2 are useful for recognition of kinds of signs standing on road shoulders and for other purposes.

The image correction section 31 in FIG. 11 makes various corrections of the images transferred from the vehicle-mounted cameras in accordance with the processing area set up by the processing area setting up section by using the lookup table prepared with calibration done in advance.

The parallax calculating section 32, while utilizing the images outputted from the image correction section, makes either the left or right image to be the standard, searches for corresponding points on the other image, finds out parallax by means of template matching, and makes up a parallax map indicating parallax corresponding to each image element on the standard image.

The image recognition section 33A uses either the image outputted from the image correction section or the parallax map outputted from the parallax calculating section, or both of the two, to recognize the objects.

As described above, the vehicle-mounted camera unit 1A configured as above can find out parallax with the CPU 6 carrying out the program and further conducts all stereo image processing up to recognition of objects within the vehicle-mounted camera unit 1. The result of recognition is transmitted to the control unit 2, and when it is judged under the control of the control unit 2 that there is a possibility of collision risk, control is made either to diminish or avoid the collision or to generate a warning sound to alert the attendants of the vehicle to the approaching risk.

In the next place, explanation is made with reference to FIG. 15 to FIG. 18B of the performances of the stereo camera device according to the present embodiment.

Figure 15:
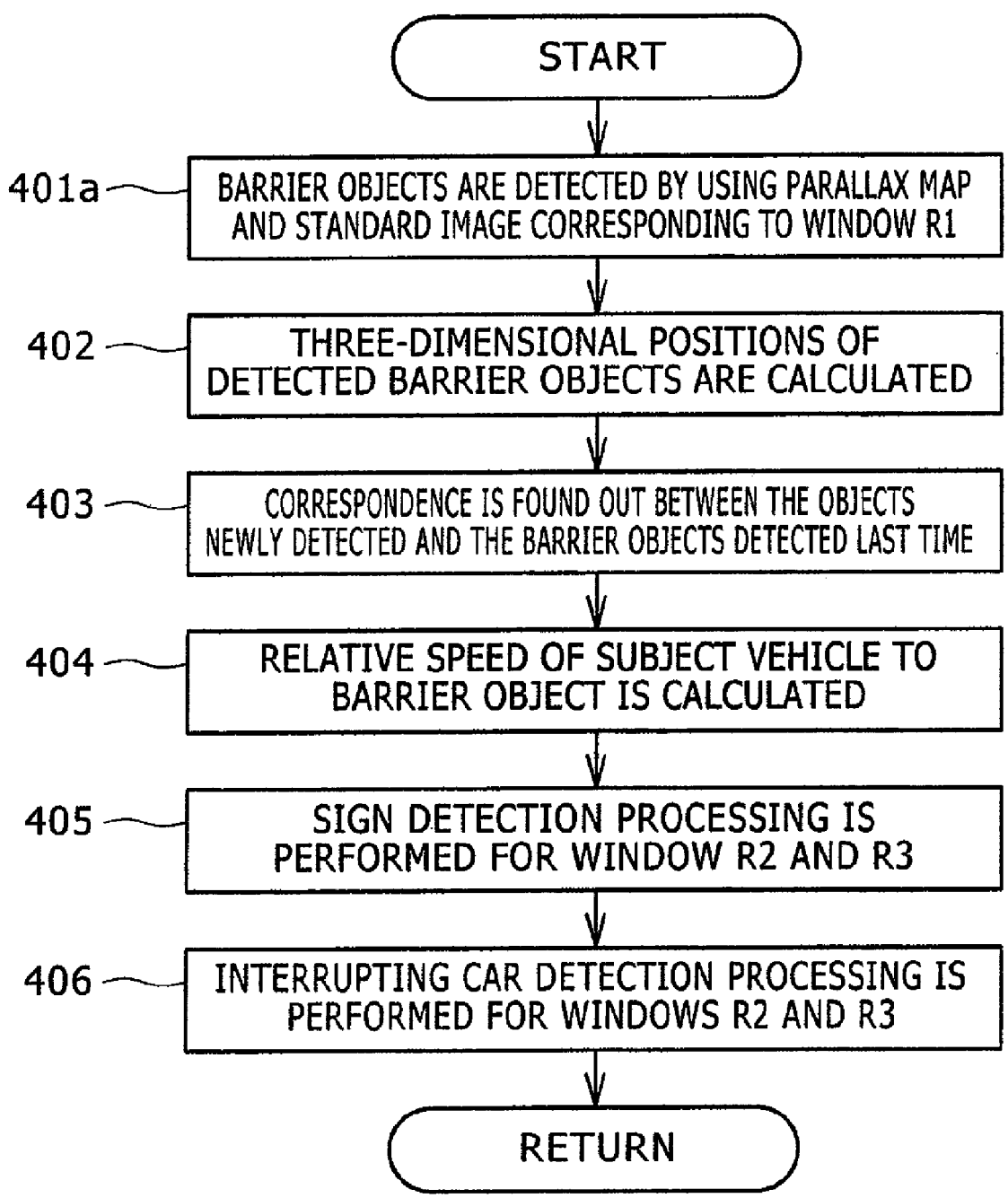
FIG. 15 is an another flowchart showing the performance of the stereo camera device according to another embodiment.
Figure 16:
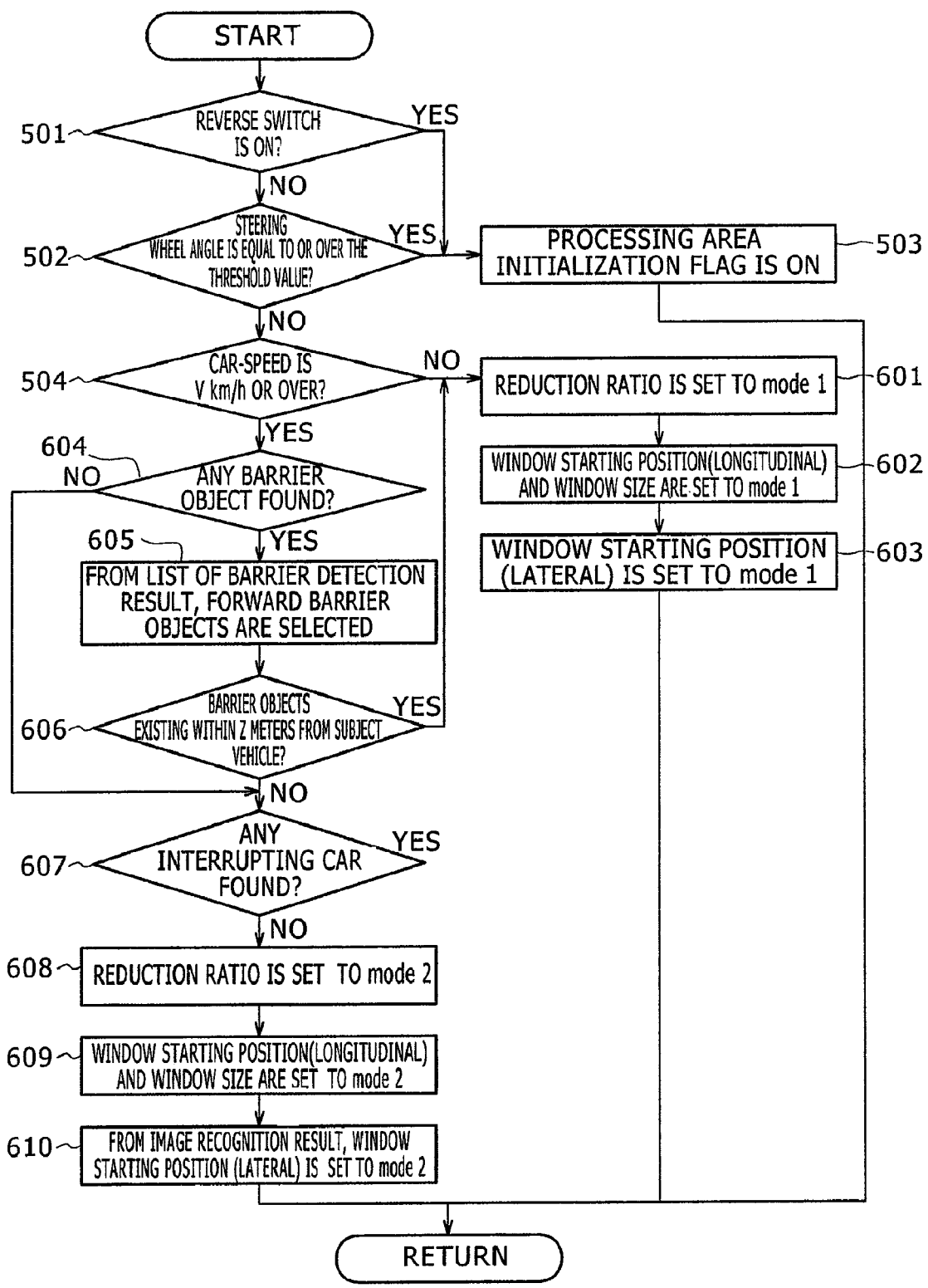
FIG. 16 is a flowchart showing the performance of the stereo camera device.

FIG. 15 and FIG. 16 are the flowcharts showing the performances of the stereo camera device according to the present embodiment. FIGS. 17A, 17B and FIGS. 18A, 18B are the explanatory drawings explaining about the window set up by the stereo camera device according to the present embodiment.

In reference to the flowcharts, explanation is made here concerning a series of processing up to the image recognition in the vehicle-mounted camera unit 1.

The series of processing shown in FIG. 4 starts when the ignition switch 20 is switched on and carried out repeatedly until the ignition switch 20 is turned off. The foregoing processing is executed regardless of whether the subject vehicle is running or parking, or whether the picture image shown on the display 15 is about the driving route guidance or about other picture image.

Hereafter, explanation is made about each step of processing for Step 107 to Step 108 covered in FIG. 4 while referring to the flowcharts shown in FIG. 15 and FIG. 16.

As shown in FIG. 15, the image recognition section 33A uses both the parallax map and the standard image, or either of the two, to detect objects (Step 401a). Assuming that the right image is the standard image according to the example in FIGS. 12A, 12B and FIGS. 14A and 14B, the above processing is carried out by using parallax in the window R1 and only the luminance value of the image in the window R2 and the window R3.

Then, the three-dimensional position is to be found out for the objects detected (Step 402), and correspondence of this newly detected cubic object to any previously detected cubic object is established (Step 403). From the result of correspondence establishment and the three-dimensional position, the relative speed is to be calculated (Step 404).

Further, to the images in the window R2 and the window R3, dark-and-light-shade pattern is used in applying the sign detection processing (Step 405) and the interrupting vehicle detection processing (Step 406).

In the next place, as shown in FIG. 16, the processing area setting up section 30A first judges whether the reverse switch is ON or not (Step 501), and when the switch is ON, the processing area initialization flag is to be set up for ON (Step 503), after which processing returns from the current procedure.

Then, judgment is made as to whether or not the steering wheel angle is equal to the threshold value or over (Step 502). When the steering wheel angle is equal to or over the threshold value, the processing area initialization flag is set ON (Step 503), after which processing returns from the current procedure.

When the steering wheel angle is below the threshold value at Step 502, the driving speed of the subject car is to be judged whether or not to be V km/h or over (Step 504), and when the speed is below V km/h, the reduction ratio is to be set to Mode 1 shown in FIG. 17A (Step 601) and the window starting position (longitudinal) and the window size are also to be set to Mode 1 (Step 602). After then, the window starting position (lateral) is to be set to Mode 1 (Step 507). FIGS. 17A and 17B show the setup values for the window 1 of the right image, but for all windows, mode changeover should be made by means of tables similar to those shown in FIGS. 17A and 17B, to set up the processing area.

When the car-speed is judged at Step 504 to be V km/h or over, judgment is made whether or not the image recognition section has recognition of the objects (Step 604), and if the judgment indicates "objects existing," the recognition result is checked to pick out preceding cars or any other objects located anteriorly (Step 605). Further judgment is made to see if the distance from the subject vehicle to the picked-out object is below Z meters (Step 606); if the distance is below Z meters, processing goes to Step 601, but in case the distance is Z meters or over, judgment is further made to see whether or not there is existence of any interrupting car (Step 607). If any interrupting car existing, processing goes to Step 601, and if not, the reduction ratio is to be set to Mode 2 (Step 608), while the window starting position (longitudinal) and the window size are also to be set to Mode 2 (Step 609). Moreover, in accordance with the x-coordinate on the lateral axis of the image coordinate system for the forward objects detected through the image recognition processing, the window starting position (lateral) is to be set up with such pre-defined values as in Mode 2 in FIG. 17B, while at the same time the window size is also set to Mode 2 (Step 610).

Figure 18A:
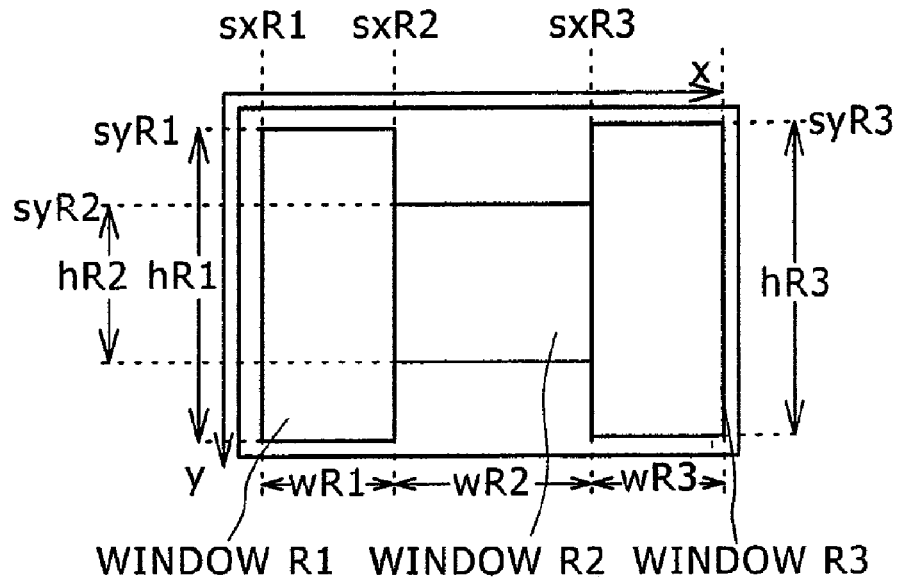
FIGS. 18A and 18B are other explanatory drawings concerning the window set up by the stereo camera device.
Figure 18B:
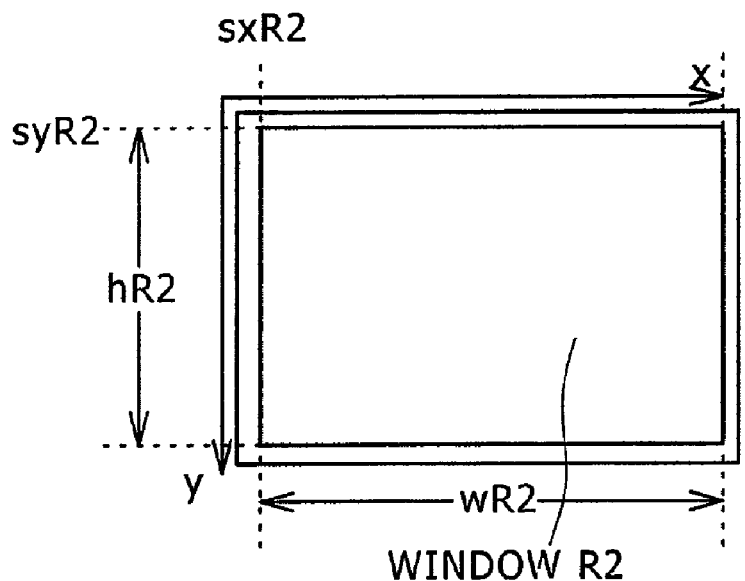

FIGS. 18A and 18B show examples of window setup according to Mode 1 and Mode 2. In this example, the speed is fast and the forward object is located a large distance away, with no car interrupting. In such a case, the central portion of the image is to be transferred as it is with high resolution, while the surrounding portion is reduced for transfer. The speed is slow, the forward object is in short range, or there are cars interrupting; in such cases, it is preferable to set up one window as if to cover up the entire image and execute transference reducing degree of resolution for the entire image. In this case, size is made zero for the two remaining windows.

According to the present embodiment as explained above, to be transferred are only those images, out of those taken with the vehicle-mounted camera 4a and the vehicle-mounted camera 4b, that match with the processing area set up by the processing area setting up section, making it possible, in consequence, to speed up image transfer processing.

Because the above processing is carried out by the image correction section, the parallax calculating section, and the image recognition section using the information of the processing area, the image cutout processing and the image reduction processing both for setup of the window allow calculating the original positions of image elements, which further allows finding out accurate parallax and three-dimensional positions. It is also possible to pursue the forward objects since the processing area is set up by the processing area setting up section based on the image recognition result.

Therefore, even when an image pickup device of high resolution is used, it is possible to reduce load of transfer and processing of image data and to carry out the stereo processing and image recognition processing in real time. Furthermore, as the extent of the image data to be transferred is decided on the basis of the image recognition result etc., it is possible to detect objects effectively no matter whether it is located long distance or short range away.

Additionally, the vehicle-mounted system employing the stereo camera device is able to make sure of the normal operation of the processing area setting up section of the system by inputting the test image and ascertaining whether or not the image to be transferred proves changes in accordance with combination of car-speed, handle angle, actuation of the reverse switch, and inputted image.

Also, feedback of the result at the image recognition section is made to the processing area setting up section to set up next area the image recognition section is going to process, permitting setting-up of the processing area including objects to have to be detected with a high degree of accuracy.

When the reverse switch 19 is ON at Step 501, the processing area initialization flag is turned ON, making it possible to process image in a wide sphere at the time of backward drive. This way of processing is effective, because at the time of backward drive, only the short range is made the target of detection but detecting objects in a wide sphere is necessary.

When the vehicle makes a right or left turn, it is highly possible that preceding cars and other objects may not be caught in the processing area. Also, since any objects located far away in the image have little risk for the subject vehicle to collide with, the objects existing in short range can only be counted as targeted. At Step 502, therefore, whether right turn or left turn is detected from the handle angle to initialize the processing area.

At the time of backward drive, it means a great change in direction of movement. It has the effect of resetting the processing area based on the result of image processing.

When the car-speed of the subject vehicle is slow, the risk of collision against any distant object is small enough to permit setting-up the processing area which is able to detect objects in short range and in a wide sphere. When the car-speed is fast to the contrary, a predetermined area is to be processed with a high resolution thereby enabling detection of distantly located objects. For this purpose, it is effective that the car-speed is judged at Step 504 so as to change over the processing area.

According to another embodiment, a plurality of processing areas can be set up with the central portion of the image arranged to be of high resolution and the surrounding portion to be of low resolution. Because the image available from the vehicle-mounted camera has objects located far away in the central portion of the image and signs etc., located in short range on both the ends of the image. Therefore, it is effective to make the central portion of the image to be of high resolution and the surrounding portion of the image to be of low resolution, and in this manner, it becomes possible to detect signs and interrupting cars located in short range, while also detecting preceding cars and other objects located far away.

It should be understood by those skilled in the art that various modifications, combinations, sub-combinations and alterations may occur depending on design requirements and other factors insofar as they are within the scope of the appended claims or the equivalents thereof.

What is claimed is:

1. A stereo camera device comprising:
a plurality of picture image taking sections; and
at least one processor comprising:
a processing area setting up section which sets up a plurality of image areas to be processed and a reduction ratio of an image based on a driving environment of a vehicle on which the stereo camera device is mounted;
an image correction section which makes a correction of picture images taken;
a parallax calculating section which calculates parallax, an amount of dislocation between a left image and a right image, based on the corrected picture images; and
an image recognition section which carries out image recognition processing for each image area in order to recognize objects; wherein:
when the plurality of image areas are set up, the image recognition section is adapted to perform the image recognition processing according to a first mode for at least one of the image areas and a second mode for the remaining image areas;
in the first mode, the image recognition processing is based on left and right images of the corrected picture images and the calculated parallax in order to recognize objects and to calculate a three-dimensional position of the recognized objects; and
in the second mode, the image recognition processing is based on the left and the right images of the corrected picture images in order to only recognize objects.

2. The stereo camera device according to claim 1, wherein:
the driving environment shows, at least, the advancing direction of the vehicle, steering wheel angle, speed of the vehicle, existence or non-existence of objects, turning speed of the vehicle, turning radius of the vehicle, daytime or nighttime, road configuration, and driving on expressway or ordinary road.

3. The stereo camera device according to claim 1, wherein:
the image taking sections transfer only data of image elements included in the image areas set up by the processing area setting up section to the image correction section.

4. The stereo camera device according to claim 1, wherein:
the processing area setting up section sets up different image areas for each of the plurality of picture image taking sections.

5. The stereo camera device according to claim 1, wherein:
the processing area setting up section sets up different reduction ratios respectively for the plurality of image areas.

6. The stereo camera device according to claim 1, wherein:
the plurality of picture image taking sections comprises a right camera placed on a right side of the vehicle and a left camera placed on a left side of the vehicle; and
the processing area setting up section functions to slide a window position of the left camera toward farther right than a window position of the right camera.

\* \* \* \* \*